(12) United States Patent
Chang et al.

(10) Patent No.: US 11,508,487 B2
(45) Date of Patent: Nov. 22, 2022

(54) FULL-DIGITAL ROD POSITION MEASUREMENT DEVICES AND METHODS THEREOF

(71) Applicant: CNNC Nuclear Power Operation Management CO., Ltd, Zhejiang (CN)

(72) Inventors: Zhengke Chang, Zhejiang (CN); Long Yu, Zhejiang (CN); ShengFeng Xu, Zhejiang (CN); ShaoHua Xu, Zhejiang (CN); Bo Chao, Zhejiang (CN); Fei Xu, Zhejiang (CN); Peng Zhao, Zhejiang (CN); Yuan Huang, Zhejiang (CN); Chengguang Yuan, Zhejiang (CN)

(73) Assignee: CNNC NUCLEAR POWER OPERATION MANAGEMENT CO., LTD, Jiaxing (CN)

( * ) Notice: Subject to any disclaimer, the term of this patent is extended or adjusted under 35 U.S.C. 154(b) by 114 days.

(21) Appl. No.: 16/753,789

(22) PCT Filed: Oct. 30, 2017

(86) PCT No.: PCT/CN2017/108248
§ 371 (c)(1),
(2) Date: Apr. 5, 2020

(87) PCT Pub. No.: WO2019/075772
PCT Pub. Date: Apr. 25, 2019

(65) Prior Publication Data
US 2020/0258643 A1 Aug. 13, 2020

(30) Foreign Application Priority Data

Oct. 16, 2017 (CN) .......................... 201710957285.1

(51) Int. Cl.
*G21C 7/12* (2006.01)
*G01D 5/22* (2006.01)
*G21C 17/10* (2006.01)

(52) U.S. Cl.
CPC ............. *G21C 7/12* (2013.01); *G01D 5/2208* (2013.01); *G21C 17/10* (2013.01)

(58) Field of Classification Search
CPC .......... G21C 17/10; G21C 17/12; G21C 7/12; G21C 7/18; G01D 5/2208; G21D 3/001; Y02E 30/00; Y02E 30/30
(Continued)

(56) References Cited

U.S. PATENT DOCUMENTS 3,893,090 A * 7/1975 Neuner .................. G01D 5/202
340/870.02
4,170,754 A * 10/1979 Schmitz ................. H03M 1/285
324/207.17

(Continued)

*Primary Examiner* — Darlene M Ritchie

(57) ABSTRACT

A full-digital control rod position measurement device and a method thereof. The full-digital rod position measurement device transforms the core process of rod position measurement that is normally processed by an analog circuit or analog-to-digital mixed circuit into a digital processing. The full-digital rod position measurement device comprises an excitation power supply, an integrated interface board, and a universal signal processor. The universal signal processor processes output signals of detectors according to a preset numerical processing algorithm and outputs Gray code rod position signals. The full-digital rod position measurement device and method disclosed by the present disclosure may effectively reduce the complexity of the primary excitation circuit and the secondary measurement signal processing circuit of the detectors, and improve the operation reliability and measurement accuracy of the rod position processing equipment.

3 Claims, 7 Drawing Sheets

(58) Field of Classification Search
USPC ............... 376/207, 215, 226, 227, 235, 240
See application file for complete search history.

(56) References Cited

U.S. PATENT DOCUMENTS

| | | | | |
|---|---|---|---|---|
| 4,668,465 A * | 5/1987 | Boomgaard | ........... | G21C 17/12 |
| | | | | 976/DIG. 242 |
| 4,714,926 A * | 12/1987 | Neuner | ................... | G01B 7/003 |
| | | | | 340/870.36 |
| 2007/0086556 A1* | 4/2007 | Nakamura | ............... | G21C 7/08 |
| | | | | 376/258 |
| 2013/0271120 A1* | 10/2013 | Reymann | ................ | G21C 7/10 |
| | | | | 324/207.15 |
| 2014/0016732 A1* | 1/2014 | Baang | ..................... | G21C 7/14 |
| | | | | 376/236 |
| 2014/0062464 A1* | 3/2014 | Reymann | ............... | G01B 7/003 |
| | | | | 324/207.15 |
| 2015/0369632 A1* | 12/2015 | Sigona | ..................... | G01V 3/10 |
| | | | | 324/207.17 |
| 2016/0240272 A1* | 8/2016 | Lee | ........................ | G21C 17/12 |
| 2017/0032855 A1* | 2/2017 | Butchart | ................. | G21C 7/36 |
| 2017/0206990 A1* | 7/2017 | Carvajal | ................. | G21C 7/36 |

* cited by examiner

S1: the universal signal processor collects the output signals of the rod position detectors, wherein the output signals of the rod position detectors comprise the voltage signals of the primary coils, the current signals of the primary coils, the voltage signals of each groups of measurement coils and the voltage signals of the auxiliary coils;

S2: according to the auxiliary coil voltage signals, the universal signal processor searches for the starting point A and the ending point B of the avoidance interval that need to be avoided due to the interference of the control rod motion in the searching interval; the ending point B of the avoidance interval is regarded as the starting point of the calculation interval, and the point located 400ms behind the ending point of the avoidance interval is regarded as the ending point C of the calculation interval; the interval between the starting point A of the avoidance interval and the ending point B of the avoidance interval is recorded as the avoidance interval AB, and the interval between the ending point B of the avoidance interval and the ending point C of the calculation interval is recorded as the calculation interval BC;

S3: the universal signal processor calculates the average value of voltage amplitudes of the auxiliary coils or the average value of currents of the primary coils in the calculation interval BC;

S4: the universal signal processor calculates the voltage amplitude average value of each group of measurement coils in the calculation interval BC;

S5: the universal signal processor divides the obtained voltage average value of each group of measurement coils by the voltage average value of the auxiliary coils, thereby obtaining the voltage correction value of each group of measurement coils, or divides the obtained voltage average value of each group of measurement coils by the current average value of primary coils, thereby obtaining the voltage correction value of each group of measurement coils;

S6: the universal signal processor compares the voltage correction value of the above groups of measurement coils with the preset threshold voltage, thereby forming the control rod position signals.

Figure 8

FULL-DIGITAL ROD POSITION MEASUREMENT DEVICES AND METHODS THEREOF

TECHNICAL FIELD

This disclosure generally relates to the technical field of control rod position measurement for nuclear power plants, and more particularly, to full-digital control rod position measurement devices and methods thereof.

BACKGROUND

Rapid regulation of reactor power is achieved primarily through controlling the lifting and lowering of the control rod cluster, wherein the lifting and lowering of the rod cluster are controlled by a rod control system.

However, conventional rod control system does not comprise a feedback mechanism capable of verifying whether the rod cluster control command has been executed correctly. As a result, a rod position measurement system is typically used to obtain the actual position of the rod cluster, monitor the operation of the rod control system, and complete the precise positioning of the control rod cluster.

As shown in FIGS. 2-5, taking the Qinshan phase II nuclear power plant as an example, the conventional rod position measurement system comprises thirty-three rod position detectors, two measurement cabinets, a distribution cabinet, a processing cabinet, and a rod position display (including thirty-three rod position display modules). The rod position detectors are located above a control rod driving mechanism, which is located on top of a reactor in a containment. The measurement cabinets and distribution cabinet are located in room L609/649 at a height of 15.5 meters (m) in an electrical power plant, the processing cabinet is located in room W228/268 at a height of 0 m in a connection building, and the rod position display is located in main control room. The measurement cabinets are used to provide an excitation to a primary coil of a detector, and shape the induced voltage signal of a measurement coil of the detector, thereby a Gray code signal indicating a rod position may be obtained. On one hand, the Gray code may be sent to the processing cabinet for comparison and processing. On the other hand, the Gray code may be converted into a binary code, which may be sent to the main control room for display after photoelectric isolation.

The conventional rod cluster control assembly and its driving shaft are located in an environment with high temperature and high pressure created by the nuclear reactor. The position measurement typically utilizes the electromagnetic induction principle and is performed using conventional rod position detectors. A conventional rod position detector typically comprises a primary coil, a measurement coil, an auxiliary coil, a coil frame, a sealing shell, and an outer sleeve.

Taking the Qinshan phase II nuclear power plant as an example, the rod position detector has a total length of 4006 millimeters (mm), an inner diameter of 154 mm and an outer diameter of 300 mm. The primary coil is a long solenoid coil, which has about 2000 turns, a wire diameter of 1.97 mm, and is wound along the entire stroke. The measurement coil and the auxiliary coil are both secondary coils, and each of which has 1700 turns, a width of 2 centimeters (cm), a wire diameter of 0.23 mm, and is coaxial with the primary coil. The primary coil is used to generate an alternating magnetic field, the measurement coil is used to form the rod position code, and the auxiliary coil is used to adjust the current of the primary coil.

The driving shaft is made of a magnetic material, while the sealing shell, the coil frame, and the outer sleeve of the detector, as well as other components in the detector, have a relatively low magnetic conductivity. Under such circumstances, whether the driving shaft passes through the measurement coil can greatly affect the induced voltage, and whether the top end of the driving shaft is above or below the measurement coil can be known through monitoring the induced voltage of the measurement coil at a particular position. As long as a sufficient number of measurement coils are arranged to monitor the induced voltage of each coil, the position of the control rod driving shaft can be roughly determined.

To roughly determine the position of the control rod, a sufficient number of measurement coils may be arranged. The number and the spacing of measurement coils are determined according to the stroke length of the driving shaft and the desired resolution. Moreover, to reduce the number of wiring between detectors and signal processing channels, and to reduce the number of signal processing devices, the measurement coils may be grouped.

Taking the Qinshan phase II nuclear power plant as an example, the length of each mechanical step of the control rod driving shaft is 15.875 mm. The full stroke is 228 mechanical steps. The resolution of the detector is 8 mechanical steps, which corresponds to 127 mm. There are 31 measurement coils, which are divided into five groups including A, B, C, D and E. The whole measurement stroke is 256 mechanical steps.

The measurement coils are grouped as follows:

First, when a measurement coil C1 is wound at the ½ height of the detector's measurement stroke, through monitoring its induced voltage (effective value, the same as below) V1, it can be known whether the rod position is in the section [0, 128) or [0, 256).

Further, when coils C21 and C22 are respectively wound at ¼ and ¾ height of the detector's whole measurement stroke, through monitoring the induced voltage V21 of C21, it can be known whether the rod position is in the section [0, 64) or [64, 128), and through monitoring the induced voltage V22 of C22, it can be known whether the rod position is in the section [128, 192) or [192, 256). Actually, these three coils have divided the whole measurement stroke into 4 sections with equal length. By monitoring the induced voltages of these three coils, it can be known which section the rod position is in, wherein the induced voltage level and the corresponding rod position are shown in the following table:

| Induced Voltage | | | | "Position of |
|---|---|---|---|---|
| V21 | V1 | V22 | Section of Rod Position | Rod Cluster" |
| Low | Low | Low | [0, 64) | 0 |
| High | Low | Low | [64, 128) | 1 |
| High | High | Low | [128, 192) | 2 |
| High | High | High | [192, 256) | 3 |

When coils C21 and C22 are series-opposing connected into a group (referred to as C2), for V21 and V22 are always in the same phase, the output voltage of C2 is V2=|V21−V22|, wherein the induced voltage level and the corresponding rod position are shown in the following table:

| Induced Voltage | | After Shaping | | Section of Rod | "Position of |
| --- | --- | --- | --- | --- | --- |
| V1 | V2 | Low→0, | High→1 | Position | Rod Cluster" |
| Low | Low | 0 | 0 | [0, 64) | 0 |
| Low | High | 0 | 1 | [64, 128) | 1 |
| High | High | 1 | 1 | [128, 192) | 2 |
| High | Low | 1 | 0 | [192, 256) | 3 |

Similarly, when coils C31, C32, C33 and C34 are respectively wound at ⅛, ⅜, ⅝ and ⅞ height of the detector's whole measurement stroke, and are connected in series to form a group C3, the whole measurement stroke can be divided into 8 sections with equal length. Through monitoring the three voltages V1, V2 and V3 (=|V31−V32+V33−V34|), it can be known which section the rod position is in, and the measurement resolution can reach 32 steps.

Further, when eight coils C41, C42 . . . and C48 are respectively wound at ¹⁄₁₆, ³⁄₁₆, ⁵⁄₁₆, ⁷⁄₁₆, ⁹⁄₁₆, ¹¹⁄₁₆, ¹³⁄₁₆ and ¹⁵⁄₁₆ height of the detector's whole measurement stroke, and are connected in series to form a group C4, the whole measurement stroke can be divided into 16 sections with equal length. Through monitoring the four voltages V1, V2, V3 and V4 (=|V41−V42+V43 . . . −V48|), it can be known which section the rod position is in, and the measurement resolution can reach 16 steps.

Further, when 16 coils C51, C52 . . . and C516 are respectively wound at ¹⁄₃₂, ³⁄₃₂, ⁵⁄₃₂ . . . and ³¹⁄₃₂ height of the detector's whole measurement stroke, and are connected in series to form a group C5, the whole measurement stroke can be divided into 32 sections with equal length. Through monitoring the five voltages V1, V2, V3, V4 and V5 (=|V51−V52+V53 . . . −V516|), it can be known which section the rod position is in, and the measurement resolution can reach 8 steps.

Generally, groups C1, C2, C3, C4 and C5 are respectively called group E, D, C, B and A. If the coils are numbered from low to high according to their positions, the respective coils in each group are:

| Coil in Group E: | 16 | | | | | | | | | | | | | | |
| --- | --- | --- | --- | --- | --- | --- | --- | --- | --- | --- | --- | --- | --- | --- | --- |
| Coils in Group D: | 8 | 24 | | | | | | | | | | | | | |
| Coils in Group C: | 4 | 12 | 20 | 28 | | | | | | | | | | | |
| Coils in Group B: | 2 | 6 | 10 | 14 | 18 | 22 | 26 | 30 | | | | | | | |
| Coils in Group A: | 1 | 3 | 5 | 7 | 9 | 11 | 13 | 15 | 17 | 19 | 21 | 23 | 25 | 27 | 29 | 31 |

The structure of the detector and the coil numbers are shown in FIG. 2.

If the excitation voltage of the primary coil of the detector is constant, the impedance in the circuit increases and the current of the primary coil decreases as the control rod driving shaft moves upward. The actual measurement shows that if the current of the primary coil remains unchanged, the induced voltage of the measurement coil when the rod position is at 100 steps is about 10% lower than that when the rod position is at 0 step. In addition, when the reactor is in cold and thermal working conditions, the impedance of the rod position detector varies greatly due to the variation of the ambient temperature. If the magnetic field is not kept constant, the measurement accuracy can be affected. FIG. 3 is a diagram showing the offset of the measurement boundary point caused by the variation of magnetic field strength.

FIG. 4 is a block diagram showing an excitation control circuit of the primary coil, which is a high-power audio amplifier circuit. The amplitude of 50 Hz sine wave is regulated by a digital potentiometer, which is controlled by the frequency signal formed by the difference between the given value and the measured value of the auxiliary coil voltage. The other way is to connect a large resistor in series in the primary excitation circuit instead of arranging an automatic control circuit, thereby making the impedance change caused by the change of the driving shaft position and the change of the detector's ambient temperature small enough to be ignored in the total impedance. The circuit of the former is complex and inevitably has a large number of components. Moreover, the temperature of the measurement clamping piece is high, and the reliability is low. Although the primary circuit of the latter is simple, the power consumption is high, and the measurement precision is low.

The signal processing process of the secondary measurement coil may adopt a filter circuit, a shaping circuit, and a threshold comparison circuit. The processing process is shown in FIG. 5 (taking the coils in group D as an example). One concern about the processing process is that there are many components, which causes long delay time of filter shaping. Additionally, the threshold voltage needs to be adjusted by repeatedly lifting and lowering the control rod when the reactor is initiated, which occupies the critical path of the refueling outage for a long time.

The present disclosure provides a digital rod position measurement device, which can effectively reduce the complexity of the detector's primary excitation circuit and secondary measurement signal processing circuit, simplify the threshold setting mode of rod position processing, and improve the reliability and measurement accuracy of rod position processing equipment.

SUMMARY

The purpose of the present disclosure is to provide a full-digital control rod position measurement device and a method thereof, which can effectively reduce the complexity of the primary excitation circuit and the secondary measurement signal processing circuit of the detectors, and improve the operation reliability and measurement accuracy of the rod position processing equipment.

To achieve the above purpose, the present disclosure adopts the following technical solution: A full-digital rod position measurement device, comprising: an excitation power supply, and a universal signal processor, wherein the excitation power supply provides a working power supply to primary coils of rod position detectors located within a containment, wherein the universal signal processor collects signals output from the rod position detectors, and the signals output from the rod position detectors comprise voltage signals of the primary coils, current signals of the primary coils, voltage signals of measurement coils of each group of a plurality of group, and voltage signals of auxiliary coils of each group of the plurality of group, wherein the universal signal processor processes the output signals from the rod position detectors according to a preset algorithm to compensate a variation of magnetic field strength of the rod position detectors, and simultaneously outputs control rod position signals.

In another preferred embodiment, the universal signal processor collects the universal signal processor collects voltage signals of the auxiliary coils of the rod position detectors, collects current signals of the primary coils of the rod position detectors, calculates voltage amplitudes of the auxiliary coils according to the voltage signals of the auxiliary coils, calculates voltage amplitudes of the primary coils according to the current signals of the primary coils, calculates, for each group of a plurality of groups, a voltage amplitude of measurement coils of the respective group according to voltage signals of measurement coils of the respective group, and processes, for each group of the plurality of groups, the voltage signals of measurement coils of the respective group using the voltage amplitude of the auxiliary coils of the respective group or the current amplitude of the primary coils of the respective group to compensate a measurement signal fluctuation, wherein the universal signal processor compares the processed voltage of measurement coils of the respective group with a preset threshold voltage to form a control rod position signal.

In another preferred embodiment, the excitation power supply adopts an AC transformer.

In another preferred embodiment, a full-digital rod position measurement method, comprises: collecting output signals of rod position detectors using a universal signal processor, wherein the output signals comprise voltages of primary coils, currents of the primary coils, voltages of measurement coils, and voltages of auxiliary coils; determining a calculation interval, wherein determining the calculation interval comprises searching, by the universal signal processor, a starting point and a ending point of an avoidance interval that need to be avoided due to interference of control rod motion in determining the avoidance interval according to the voltages of auxiliary coils, assigning the ending point of the avoidance interval to be a starting point of the calculation interval, and assigning a point located 400 milliseconds behind the ending point of the avoidance interval to be an ending point of the calculation interval, and recording the avoidance interval between the starting point of the avoidance interval and the ending point of the avoidance interval, and recording the calculation interval between the ending point of the avoidance interval and the ending point of the calculation interval; for each group of a plurality of groups, calculating, by the universal signal processor, an average voltage of the auxiliary coils in the respective group in the calculation interval or an average current of the primary coils in the respective group in the calculation interval; for each group of the plurality of groups, calculating, by the universal signal processor, an average voltage of the measurement coils in the respective group in the calculation interval; for each group of the plurality of groups, calculating, by the universal signal processor, an voltage correction value of the measurement coils in the respective group, wherein the voltage correction value is calculated by dividing the average voltage of the measurement coils in the respective group by the average voltage of the auxiliary coils in the respective group, or dividing the average voltage of the measurement coils in the respective group by the average current of the primary coils in the respective group; and for each group of the plurality of groups, comparing, by the universal signal processor, the voltage correction value of the measurement coils in the respective group with a preset threshold voltage to form a control rod position signal.

In another preferred embodiment, determining the calculation interval further comprises assigning the calculation interval to be 400 milliseconds when the avoidance interval cannot be searched by the universal signal processor.

In another preferred embodiment, calculating the respective average voltage of the auxiliary coils in the respective group in the calculation interval or the respective average current of the primary coils in the respective group in the calculation interval comprises using fast Fourier transform or average peak-to-peak value calculation.

BRIEF DESCRIPTION OF THE DRAWINGS

FIG. 8 is a flowchart illustrating an example operation of measurement signal processing of a rod position detector.

Marking instructions of the figures: 10-Excitation Power Supply, 11-AC Transformer, 20-Integrated Interface Board, 30-Universal Signal Processor, 40-Rod Position Detector, 41-1-The First Primary Coil Terminal, 41-2-The Second Primary Coil Terminal, 42-The First Auxiliary Coil Terminal, 43-The Second Auxiliary Coil Terminal, 44-Group A Measurement Coil Signal Terminal, 45-Group B Measurement Coil Signal Terminal, 46-Group C Measurement Coil Signal Terminal, 47-Group D Measurement Coil Signal Terminal, 48-Group E Measurement Coil Signal Terminal, 49-Measurement Coil Common Terminal, 50-Rod Position Processing Cabinet, 60-Main Control Room Analog Indicator Board, 71-Sampling Resistor, 72-Short-circuit-proof Fuse, 73-Rod Drop Test Switch

DETAILED DESCRIPTION

The present disclosure describes a full-digital control rod position measurement device and a method thereof. Preferred embodiments are combined hereinafter to further elaborate the implementation of the techniques of this disclosure.

Figure 1:
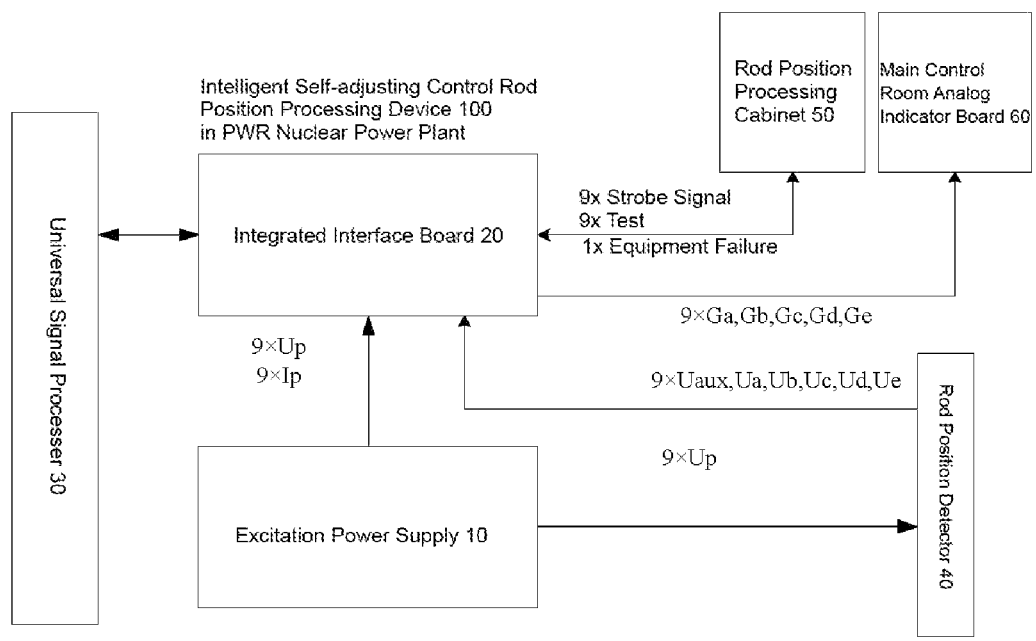
FIG. 1 is a system block diagram illustrating an example structure of a full-digital rod position measurement device.
Figure 2:
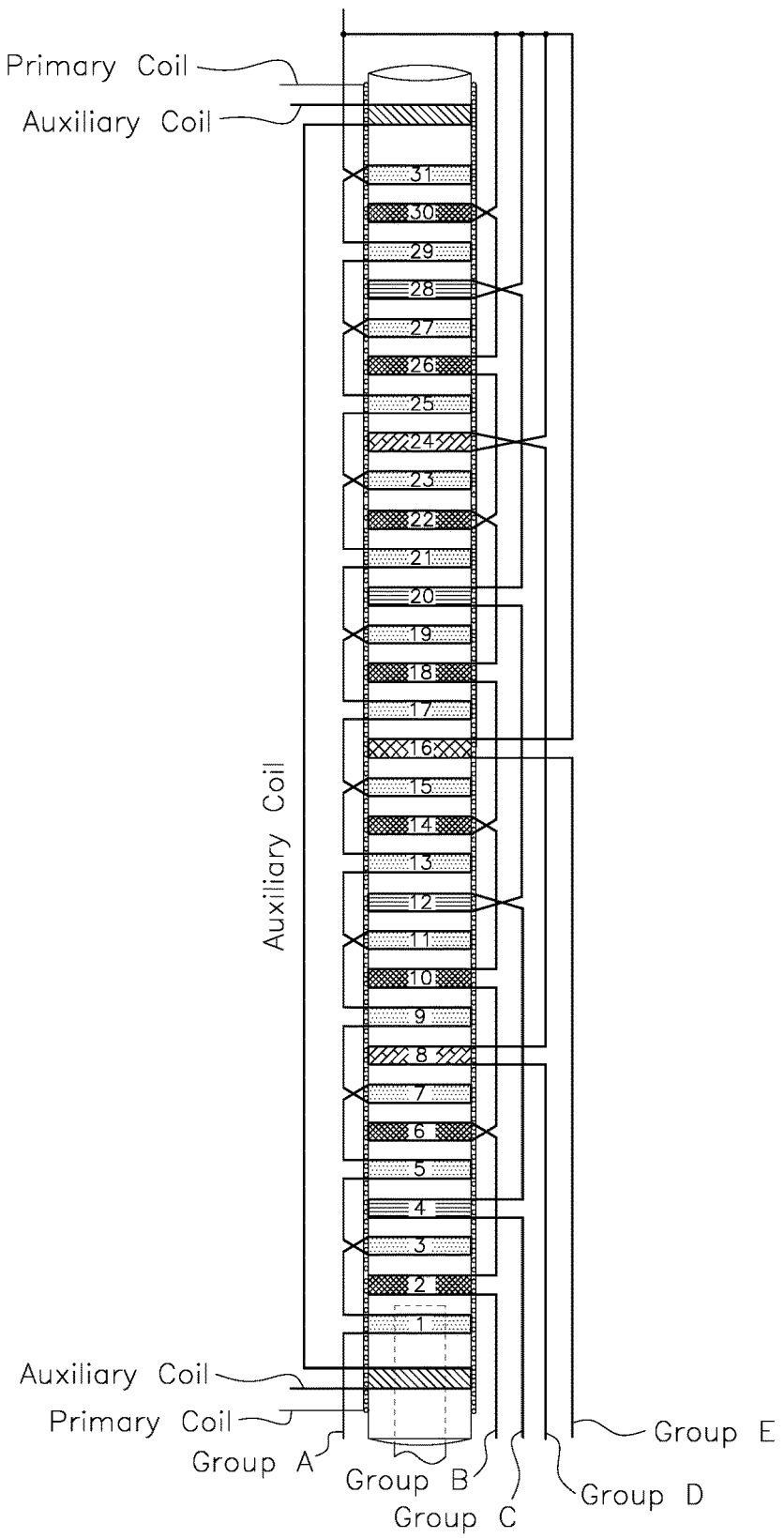
FIG. 2 is a conceptual diagram illustrating an example coil arrangement and connection mode of a rod position detector.
Figure 3:
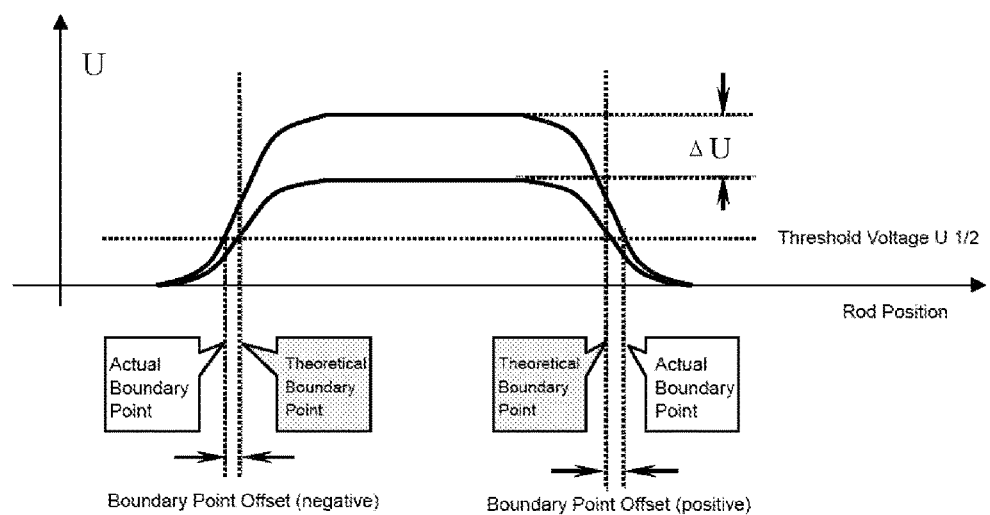
FIG. 3 is a conceptual diagram illustrating an example offset of measurement boundary point caused by a variation of magnetic field strength.
Figure 4:
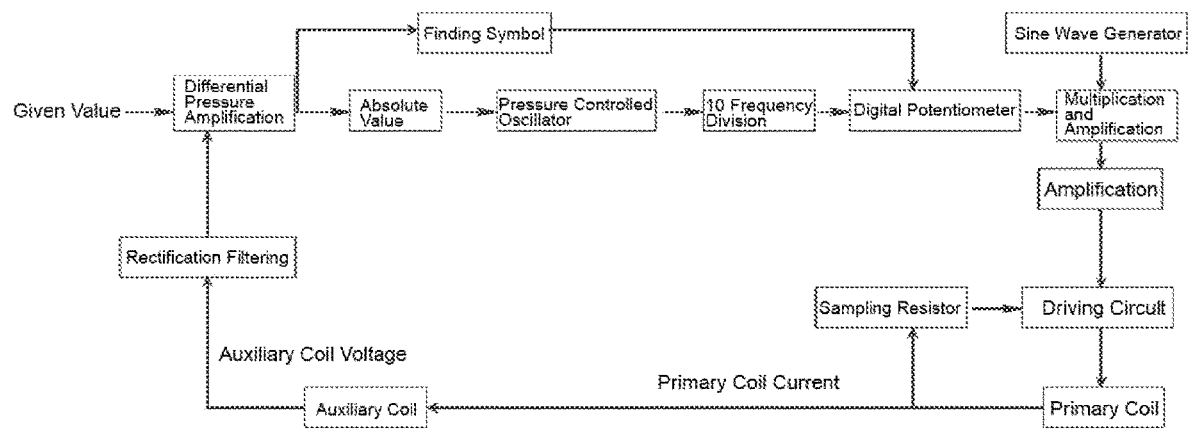
FIG. 4 is a system block diagram illustrating an example excitation control circuit of a primary coil.
Figure 5:
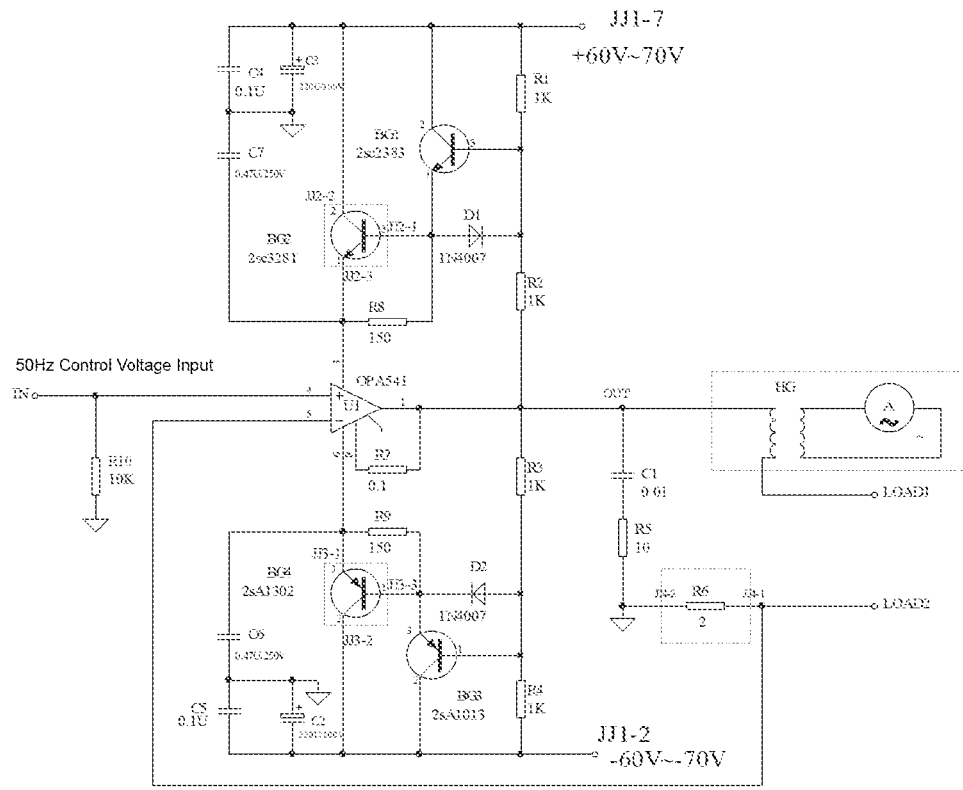
FIG. 5 is a conceptual diagram illustrating an example high-power output circuit.
Figure 6A:
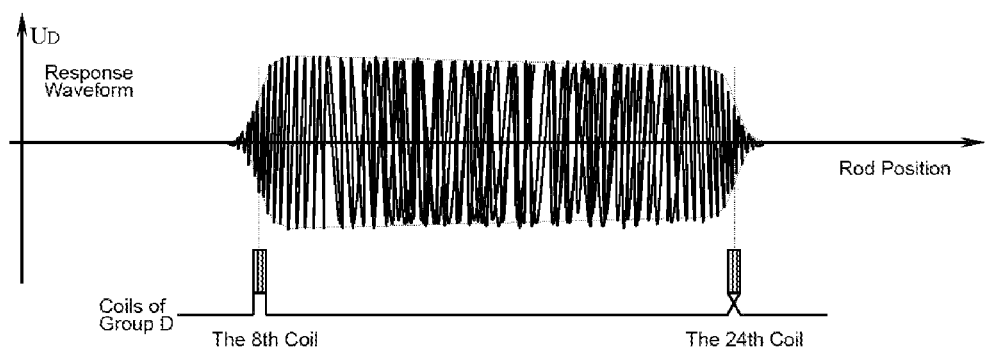
FIGS. 6B-6C are schematic diagrams illustrating measurement signal processing process of a rod position detector.
Figure 6B:
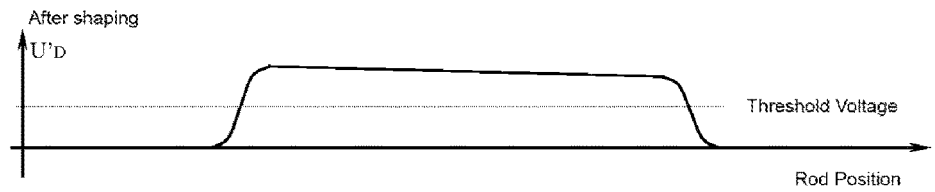
Figure 6C:
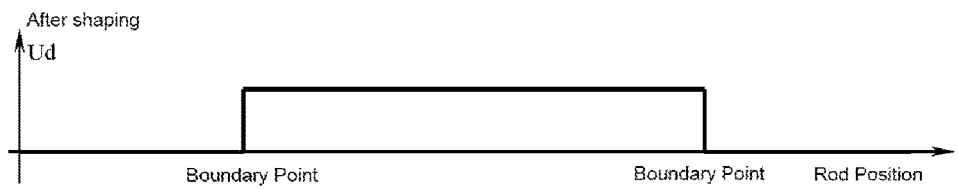

FIG. 1 shows the module structure of a full-digital control rod position measurement device 100.

Preferably, the full-digital control rod position measurement device comprises an excitation power supply 10 and a universal signal processor 30, wherein the excitation power supply 10 provides a working power supply to the primary coils of the rod position detectors located within the containment, wherein the universal signal processor 30 collects the signals output by the rod position detectors. The signals output by the rod position detectors comprise the voltage signals of the primary coils, the voltage signals of measurement coils of each group of a plurality of groups, and the voltage signals of the auxiliary coils of each group of the plurality of groups. The universal signal processor 30 processes the output signals of the detectors according to a preset algorithm, thereby compensating for the variation of magnetic field strength of the rod position detectors, and simultaneously outputs the control rod position signals.

According to the aforesaid technical solution, the universal signal processor 30 collects the voltage signals of the auxiliary coils of the detectors, calculates the voltage amplitudes of the auxiliary coils according to the voltage signals of the auxiliary coils, calculates the voltage amplitudes of the measurement coils of each group according to the voltage signals of the measurement coils of each group. For each group, the universal signal processor 30 processes the voltage signal of the measurement coils of the respective group using the voltage amplitude of the auxiliary coils of the respective group, thereby compensating for the measurement signal fluctuation caused by the variation of measurement conditions. For each group, the universal signal processor 30 respectively compares the processed voltages of measurement coils of the respective group with the preset threshold voltage, thus forming a respective control rod position signal.

According to the aforesaid technical solution, the excitation power supply 10 adopts an AC transformer 11.

Figure 7:
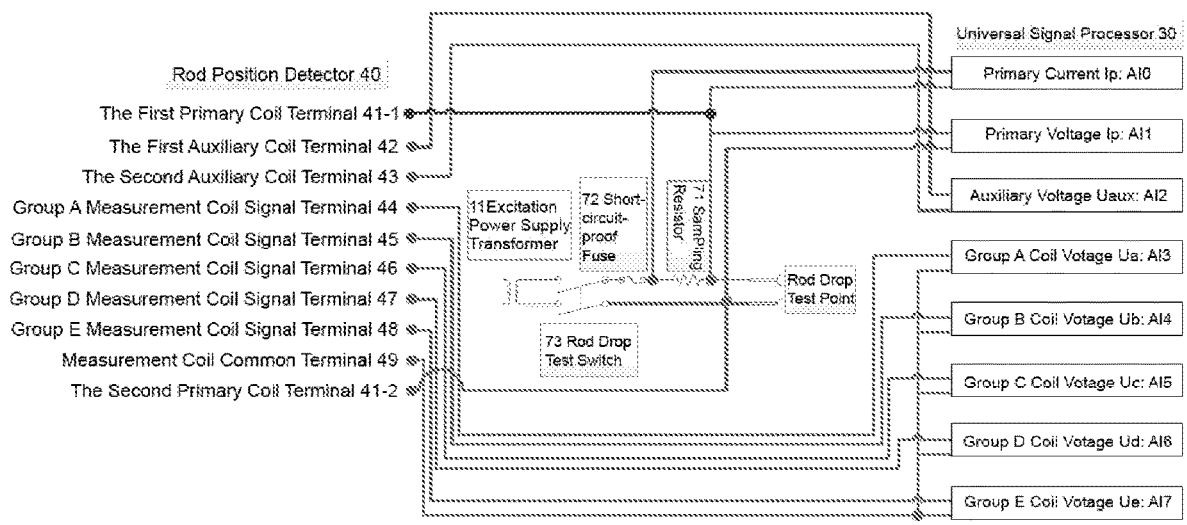
FIG. 7 is a schematic diagram showing a connection mode.

According to the aforesaid technical solution, the universal signal processor 30 adopts the Compact RIO platform developed by National Instruments Corporation, USA. FIG. 7 shows the connection mode of the full-digital control rod position measurement device 100. Preferably, the excitation power supply 10 adopts an AC transformer 11 (excitation power transformer). The full-digital rod position measurement device 100 is provided with a rod drop test point, and further comprises a sampling resistor 71, a short-circuit-proof fuse 72 and a rod drop test switch 73. The output end of the AC transformer 11 is electrically connected with the input side of the rod drop test switch 73, and the short-circuit-proof fuse 72 and the sampling resistor 71 are sequentially connected in series between the output end of the rod drop test switch 73 and the rod drop test point.

As shown in FIG. 7, preferably, the rod position detector 40 is provided with a first primary coil terminal 41-1, a second primary coil terminal 41-2, a first auxiliary coil terminal 42, a second auxiliary coil terminal 43, signal terminals 44-48 of measurement coils of groups A to E, and a measurement coil common terminal 49.

Preferably, the preset numerical processing algorithm is to compensate for the position deviation of the control rod and the variation of the ambient temperature according to the measurement voltage signals of the auxiliary coils. In other words, the universal signal processor 30 forms control rod position signals in the form of Gray code (hereinafter referred to as Gray code rod position signals) through threshold comparison according to the collected voltages of the auxiliary coils and the collected voltages of measurement coils of each group.

Specifically, the output signals of the rod position detectors comprise, but are not limited to, the voltage signals of the primary coils, the current signals of the primary coils, the voltage signals of the measurement coils of each group of a plurality of groups, and the voltage signals of the auxiliary coils of each group of the plurality of groups. For each group, the universal signal processor 30 calculates an average voltage amplitude of the auxiliary coils of the respective group according to the voltage signals of the auxiliary coils of the respective group. The universal signal processor 30 also calculates an average voltage amplitude of the measurement coils of the respective group according to the voltage signals of the measurement coils of the respective group, and performs a homogenization processing according to the average voltage amplitude of the auxiliary coils of the respective group. The universal signal processor 30 then compares the homogenized average value of voltage amplitude of the of measurement coils of the respective group with the preset threshold voltage, thereby forming a Gray code rod position signal.

Preferably, the integrated interface board 20 is provided with a bus latch (not shown). The rod position processing cabinet 50 may provide nine strobe signals, and the universal signal processor 30 may output the Gray code rod position signals to the rod position processing cabinet 50 through the bus latch according to the strobe signals. Alternatively, the universal signal processor 30 may also output signals reflecting the operational failure of the rod position measurement device to the rod position processing cabinet 50, and the outputted signals may show "the measurement channel being under test" of each rod cluster, etc.

Preferably, the full-digital rod position measurement device 100 also transmits the Gray code rod position signals to a main control room analog indicator board 60 through the integrated interface board 20 for analog indication.

According to the aforesaid embodiment of the present disclosure, the full-digital rod position measurement device 100 switches among an automatic correction state, an operation state, and a test state. When the full-digital rod position measurement device 100 is in the automatic correction state, the measurement channel may be automatically corrected under the thermal working condition after the reactor overhaul, thereby obtaining the setting threshold of each group of measurement coils. The obtained threshold may be stored in a setting results file (to be used after the equipment failure maintenance). When the full-digital rod position measurement device 100 is in the operation state (e.g., a state it switches into after the correction is completed), the measurement position of the control rod may be determined according to the measurement signals and the setting threshold. During the normal operation of the reactor, when performing the regular test of the rod position measurement channel, the full-digital rod position measurement device 100 may switch to the test state and perform the channel correction 0, correction 1, and the continuous change test of the output rod position.

As shown in FIG. 7, the signals required to be processed by the full-digital rod position measurement device are as follows:

1. 75 analog input signals
   1) Each rod position detector 40 has 8 analog input signals (9 rod position detectors and 72 analog input signals in total), which respectively are:
      a) Primary coil voltage Up;
      b) Primary coil current Ip;
      c) Auxiliary coil voltage Uaux;
      d) Group A coil voltage Ua;
      e) Group B coil voltage Ub;
      f) Group C coil voltage Uc;
      g) Group D coil voltage Ud;
      h) Group E coil voltage Ue;
   2) The analog input signals for monitoring the internal working power of the case are preferably 3 analog input signals.
2. 9 switch input signals
   9 strobe signals (switch input signals) are provided by the rod position processing cabinet 50.

3. 61 switch output signals
   1) 9 "rod cluster being under test" signals output to the rod position processing cabinet 50;
   2) 5-bit Gray code signal and 1 bus switch signal output to the rod position processing cabinet 50;
   3) "Equipment failure" signal output to the rod position processing cabinet 50;
   4) 9 5-bit Gray code rod position signals output to the main control room.

Preferably, according to the requirements of input and output channel numbers and system performance, the universal signal processor 30 adopts the Compact RIO platform developed by National Instruments Corporation, USA.

Figure 9:
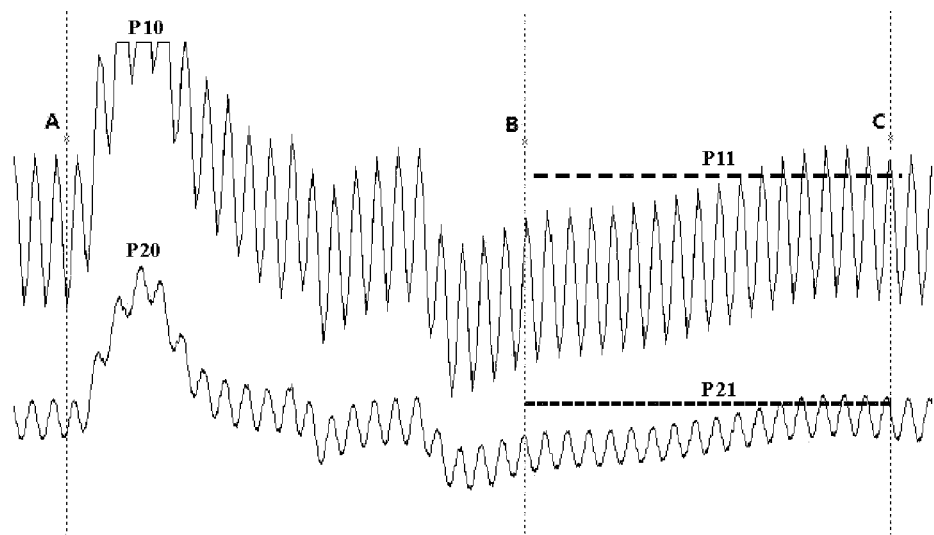
FIG. 9 is a schematic diagram illustrating an example avoidance interval AB and an example calculation interval BC according to the techniques of this disclosure.

As shown in FIG. 9, curve P10 in FIG. 9 is the auxiliary voltage waveform, curve P20 is the group A measurement voltage waveform, P11 is the auxiliary voltage mean line, and P21 is the group A measurement voltage mean line (the group A measurement voltage waveform is taken as an example herein, and the rest groups of measurement voltage waveforms are handled in the same manner). The present disclosure also describes a full-digital rod position measurement method, wherein through searching an avoidance interval AB interfered by the control rod motion, the avoidance interval AB is avoided when calculating the voltages of measurement coils of each group of a plurality of groups, thereby obtaining voltage signals of measurement coils in each group that represent the actual position of the control rod, wherein the above groups of measurement coil voltage signals are used as the basis for judging the actual position of the control rod, comprising the steps of:

Step S1: collecting the signals of detectors: the universal signal processor collects the output signals of the rod position detectors, wherein the output signals of the rod position detectors comprise the voltage signals of the primary coils, the voltage signals of measurement coils of each group, and the voltage signals of the auxiliary coils of each group;

Step S2: determining the calculation interval: according to the auxiliary coil voltage signals, the universal signal processor searches for the starting point A and the ending point B of the avoidance interval that need to be avoided due to the interference of the control rod motion in the searching interval; the ending point B of the avoidance interval is regarded as the starting point of the calculation interval, and the point located 400 ms behind the ending point of the avoidance interval is regarded as the ending point C of the calculation interval; the interval between the starting point A of the avoidance interval and the ending point B of the avoidance interval is recorded as the avoidance interval AB, and the interval between the ending point B of the avoidance interval and the ending point C of the calculation interval is recorded as the calculation interval BC;

Step S3: calculating the voltages of auxiliary coils: the universal signal processor calculates the average value of voltage amplitudes of the auxiliary coils in the calculation interval BC;

Step S4: calculating the voltages of measurement coils of each group: the universal signal processor calculates the voltage amplitude average value of measurement coils of each group in the calculation interval BC;

Step S5: calculating the voltage correction value of the measurement coil of each group: for each group of the plurality of groups, the universal signal processor divides the average voltage of the measurement coils of the respective group by the average voltage of the auxiliary coils of the respective group, thereby obtaining a voltage correction value of measurement coils of the respective group;

Step S6: comparing the thresholds: the universal signal processor compares the voltage correction value of the above groups of measurement coils with the preset threshold voltage, thereby forming the control rod position signals.

In step S2, when the avoidance interval AB cannot be searched by the universal signal processor, the last 400 ms of the searching interval is taken as the calculation interval BC.

According to the aforesaid embodiment, one full-digital rod position measurement device 100 can realize the parallel data collection and control processing of 72 analog signals of 9 rod position detectors at the same time, capable of storing and displaying the failures, abnormalities and waveforms containing abnormal variations. Thus, the relevant requirements of rod position measurement processing can be satisfied.

It is worth mentioning that, through adopting the full-digital rod position measurement device according to the present disclosure, the threshold setting of the measurement channel and the appraisal of the measurement performance can be completed when the control rod is lifted and lowered for one stroke, and the occupation time of the critical path of refueling outage can be shortened to be within one third of the original time occupied by the performance appraisal of the rod position system.

The present disclosure also discloses another preferred embodiment. In this embodiment, the full-digital rod position measurement device comprises an excitation power supply and a universal signal processor, wherein the excitation power supply provides a working power supply to the primary coils of the rod position detectors located within a containment, wherein the universal signal processor collects the signals output from the rod position detectors, and the signals output from the rod position detectors comprise the voltage signals of the primary coils, the current signals of the primary coils, the voltage signals of measurement coils of each group of a plurality of groups, and the voltage signals of the auxiliary coils of each group of the plurality of groups, wherein the universal signal processor processes the output signals of the detectors according to a preset algorithm, thereby compensating for the variations of magnetic field strength of the rod position detectors, and simultaneously outputs the control rod position signals.

According to the aforesaid technical solution, the universal signal processor collects the voltage signals of the auxiliary coils of the detectors, collects the current signals of the primary coils of the detectors, calculates the voltage amplitudes of the auxiliary coils according to the voltage signals of the auxiliary coils, calculates the voltage amplitudes of the primary coils according to the current signals of the primary coils. For each group of the plurality of groups, the universal signal processor calculates an voltage amplitude of the measurement coils of the respective group according to the voltage signals of the measurement coils of the respective group, and processes the voltage signals of measurement coils of the respective group by using the voltage amplitude of the auxiliary coils of the respective group or the current amplitude of the primary coils of the respective group, thereby compensating for the measurement signal fluctuation caused by the variation of measurement conditions. The universal signal processor respectively compares the processed voltage of the measurement coils of the respective group to the preset threshold voltage, thus forming a control rod position signal.

According to the aforesaid technical solution, the excitation power supply adopts an AC transformer.

As shown in FIG. 8, the present disclosure also discloses a full-digital rod position measurement method, wherein through searching the avoidance interval AB interfered by the control rod motion, the avoidance interval AB is avoided when calculating the voltages of measurement coils of each group, thereby obtaining each group of measurement coil voltage signals representing the actual position of the control rod, wherein the above groups of measurement coil voltage signals are used as the basis for judging the actual position of the control rod, comprising the steps of:

Step S1: collecting the signals of detectors: the universal signal processor collects the output signals of the rod position detectors, wherein the output signals of the rod position detectors comprise the voltage signals of the primary coils, the current signals of the primary coils, the voltage signals of the measurement coils of each group of a plurality of groups and the voltage signals of the auxiliary coils of each groups of the plurality of groups;

Step S2: determining the calculation interval: according to the auxiliary coil voltage signals, the universal signal processor searches for the starting point A and the ending point B of the avoidance interval that need to be avoided due to the interference of the control rod motion in the searching interval; the ending point B of the avoidance interval is regarded as the starting point of the calculation interval, and the point located 400 ms behind the ending point of the avoidance interval is regarded as the ending point C of the calculation interval; the interval between the starting point A of the avoidance interval and the ending point B of the avoidance interval is recorded as the avoidance interval AB, and the interval between the ending point B of the avoidance interval and the ending point C of the calculation interval is recorded as the calculation interval BC;

Step S3: calculating the average voltage of the auxiliary coils of each group or average currents of the primary coils of each group: for each group of the plurality of groups, the universal signal processor calculates an average voltage of the auxiliary coils of the respective group in the calculation interval BC or an average current of the primary coils of the respective group in the calculation interval BC;

Step S4: calculating the voltages of measurement coils of each group: for each group of the plurality of groups, the universal signal processor calculates an average voltage of measurement coils of the respective group in the calculation interval BC;

Step S5: calculating the voltage correction value of measurement coils of each group: for each group of the plurality of groups, the universal signal processor divides the obtained average voltage of measurement coils of the respective group by the average voltage of the auxiliary coils of the respective group, thereby obtaining the voltage correction value of the measurement coils of the respective group, or divides the average voltage of the measurement coils of the respective group by the average current value of the primary coils of the respective group, thereby obtaining the voltage correction value of the measurement coils of the respective group;

Step S6: comparing threshold: the universal signal processor compares the voltage correction value of measurement coils of the respective group with the preset threshold voltage, thereby forming a control rod position signal.

According to the aforesaid full-digital rod position measurement method, in step S2, when the avoidance interval AB cannot be searched by the universal signal processor, the waveform of 400 ms in the searching interval is taken as the calculation interval BC.

According to the aforesaid full-digital rod position measurement method, in step S3, the universal signal processor calculates the average voltage of the auxiliary coils of the respective group in calculation interval BC or the average current of the primary coils of the respective group in calculation interval BC by using fast Fourier transform or average peak-to-peak value calculation.

Those skilled in the art may modify the technical solutions recorded in the aforesaid embodiments, or equally replace some of the technical features according to the specification of the present disclosure. Therefore, modifications, equivalent replacements and improvements made within the spirit and principles of the disclosure shall fall into the scope of the present disclosure.

What is claimed is:

1. A full-digital rod position measurement method, comprises:

collecting output signals of rod position detectors by a universal signal processor, wherein the output signals comprise voltages of primary coils, currents of the primary coils, voltages of measurement coils, and voltages of auxiliary coils;

determining a calculation interval, wherein determining the calculation interval comprises searching, by the universal signal processor, a starting point and an ending point of an avoidance interval that needs to be avoided due to interference of control rod motion in determining the avoidance interval according to the voltages of auxiliary coils, assigning the ending point of the avoidance interval to be a starting point of the calculation interval, and assigning a point located 400 milliseconds behind the ending point of the avoidance interval to be an ending point of the calculation interval, recording an avoidance interval between the starting point of the avoidance interval and the ending point of the avoidance interval, and recording a calculation interval between the ending point of the avoidance interval and the ending point of the calculation interval;

for each group of a plurality of groups, calculating, by the universal signal processor, a respective average voltage of the auxiliary coils in the respective group in the calculation interval or a respective average current of the primary coils in the respective group in the calculation interval;

for each group of the plurality of groups, calculating, by the universal signal processor, a respective average voltage of the measurement coils in the respective group in the calculation interval;

for each group of the plurality of groups, calculating, by the universal signal processor, a respective voltage correction value of the measurement coils in the respective group, wherein the respective voltage correction value is calculated by dividing the respective average voltage of the measurement coils in the respective group by the respective average voltage of the auxiliary coils in the respective group, or dividing the respective average voltage of the measurement coils in the respective group by the respective average current of the primary coils in the respective group; and for each group of the plurality of groups, comparing, by the universal signal processor, the respective voltage correction value of the measurement coils in the respective group with a preset threshold voltage to form a respective control rod position signal.

2. The full-digital rod position measurement method of claim 1, wherein determining the calculation interval further comprises assigning the calculation interval to be 400 milliseconds when the avoidance interval cannot be searched by the universal signal processor.

3. The full-digital rod position measurement method of claim 1, wherein calculating the respective average voltage of the auxiliary coils in the respective group in the calculation interval or the respective average current of the primary coils in the respective group in the calculation interval comprises using fast Fourier transform or average peak-to-peak value calculation.

\* \* \* \* \*